(12) United States Patent
Shibasaki et al.

(10) Patent No.: US 9,165,689 B2
(45) Date of Patent: Oct. 20, 2015

(54) PLANT OPERATION METHOD AND PLANT OPERATION SYSTEM

(75) Inventors: Osamu Shibasaki, Yokohama (JP);
Masato Okamura, Yokohama (JP); Seiji Yamamoto, Setagaya-Ku (JP); Toyoaki Miyazaki, Ota-Ku (JP); Kenji Yamazaki, Yokohama (JP); Tetsuji Kaneko, Yokohama (JP); Minoru Kobayashi, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 840 days.

(21) Appl. No.: 13/148,606

(22) PCT Filed: Feb. 8, 2010

(86) PCT No.: PCT/JP2010/051772
§ 371 (c)(1),
(2), (4) Date: Nov. 4, 2011

(87) PCT Pub. No.: WO2010/090307
PCT Pub. Date: Aug. 12, 2010

(65) Prior Publication Data
US 2012/0039429 A1 Feb. 16, 2012

(30) Foreign Application Priority Data
Feb. 9, 2009 (JP) ................................ 2009-027570

(51) Int. Cl.
*G21C 9/00* (2006.01)
*G21C 17/022* (2006.01)
(Continued)

(52) U.S. Cl.
CPC ............ *G21C 17/0225* (2013.01); *C23F 11/18* (2013.01); *C23F 11/185* (2013.01);
(Continued)

(58) Field of Classification Search
CPC .... G21C 17/0225; G21C 19/307; G21C 3/08; C23F 11/185; C23F 11/187; C23F 11/18; F01K 3/181; F22B 1/023; F22B 37/02; G21D 3/08

USPC .......................................................... 376/306
See application file for complete search history.

(56) References Cited

U.S. PATENT DOCUMENTS 4,842,812 A * 6/1989 Panson et al. .................. 376/306
5,015,436 A * 5/1991 Nagase et al. ................. 376/306
(Continued)

FOREIGN PATENT DOCUMENTS

JP 54 101734 8/1979
JP 10 339793 12/1998
(Continued)

OTHER PUBLICATIONS

Christopher J. Wood, Recent Developments in LWR Radiation Field Control, Progress in Nuclear Energy, vol. 19, No. 3, pp. 241-266, 1987.*
(Continued)

*Primary Examiner* — Frank J McGue
(74) *Attorney, Agent, or Firm* — Oblon, McClelland, Maier & Neustadt, L.L.P.

(57) ABSTRACT

The present invention provides an operation method of a plant which has a low-pressure feed water heater, a deaerator and a high-pressure feed water heater sequentially arranged in a feed water pipe reaching a steam generator from a condenser, and leads high-temperature feed water to the steam generator, wherein an oxidant is injected onto a surface of a structural material from an oxidant injection line in order to form a film that suppresses an elution of an element constituting the structural material such as the feed water pipe, the low-pressure feed water heater, the deaerator and the high-pressure feed water heater, which come in contact with the high-temperature feed water, and a corrosion suppression substance is further introduced from a corrosion suppression substance introduction line in order to deposit the corrosion suppression substance on a surface of the structural material in which corrosion accelerated by a flow of the feed water occurs.

14 Claims, 6 Drawing Sheets

(51) Int. Cl.

| | |
|---|---|
| *C23F 11/18* | (2006.01) |
| *F01K 3/18* | (2006.01) |
| *F22B 1/02* | (2006.01) |
| *F22B 37/00* | (2006.01) |
| *G21C 19/307* | (2006.01) |
| *G21D 3/08* | (2006.01) |

(52) U.S. Cl.
CPC .............. *C23F11/187* (2013.01); *F01K 3/181* (2013.01); *F22B 1/023* (2013.01); *F22B 37/002* (2013.01); *G21C 19/307* (2013.01); *G21D 3/08* (2013.01); *Y02E 30/40* (2013.01)

(56) References Cited

U.S. PATENT DOCUMENTS

| | | | |
|---|---|---|---|
| 7,449,101 B2 | 11/2008 | Okamura et al. | |
| 8,900,670 B2 * | 12/2014 | Singh et al. | 427/388.1 |
| 2002/0122526 A1 * | 9/2002 | Hidaka et al. | 376/283 |
| 2003/0180180 A1 | 9/2003 | Okamura et al. | |
| 2006/0050833 A1 | 3/2006 | Ichikawa et al. | |
| 2006/0146975 A1 | 7/2006 | Okamura et al. | |
| 2014/0242299 A1 * | 8/2014 | Okamura et al. | 427/595 |

FOREIGN PATENT DOCUMENTS

| | | |
|---|---|---|
| JP | 2002 71883 | 3/2002 |
| JP | 2003 232886 | 8/2003 |
| JP | 2004 20411 | 1/2004 |
| JP | 2005 195346 | 7/2005 |
| JP | 2005-291815 A | 10/2005 |
| JP | 2006 38811 | 2/2006 |

OTHER PUBLICATIONS

Machine Translation of JP2004-20411 A, Toshiba Corp., Jan. 22, 2004.*
Machine Translation of JP10-339793A, Toshiba Corp., Dec. 22, 1998.*
Korean Office Action issued Jan. 29, 2014 in Patent Application No. 10-2011-7018497.
International Search Report Issued Mar. 16, 2010 in PCT/JP10/051772 filed Feb. 8, 2010.
Supplementary European Search Report Issued Dec. 5, 2012 in Patent Application No. 10 73 8635.1.
International Preliminary Report on Patentability and Written Opinion issued Sep. 13, 2011 in patent application No. PCT/JP2010/051772 filed Feb. 8, 2010.

* cited by examiner

PLANT OPERATION METHOD AND PLANT OPERATION SYSTEM

TECHNICAL FIELD

The present invention relates to a plant operation method and a plant operation system which are suitable for the corrosion suppression of a structural material such as a feed water pipe.

BACKGROUND ART

In various plants, each of which is provided with a boiler, a steam generator and the like and uses high-temperature water, including a thermal power plant and a nuclear power plant, there may cause a case where a metal of a structural material is subjected to an aged deterioration phenomenon such as ionic elution and the formation of a corrosion product. Deposition of the corrosion product disturbs a flow channel in a pipe, resulting in a cause of vibration.

Furthermore, the vibration under a high flow-velocity condition may cause a crack or damage in the structural material, and in addition, when the corrosion product deposits on a heat transfer surface in the steam generator of a pressurized-water nuclear power plant, a feed water heater or the like of a boiling-water reactor power plant or a thermal power plant, the corrosion product may cause the decrease of the heat transfer coefficient.

In such steam generator and feed water heater, an impurity concentration in feed water is kept at low concentration by continuous blow water in the apparatus, but in a narrow portion such as a crevice portion between a heat transfer pipe and a support plate, water quality occasionally differs from a controlled value, which may result in that the impurities are concentrated in the narrow portion, a corrosive environment is created in the portion, and it may also be assumed that a scale (oxide) or the like deposits therein. In addition, even in the piping in a pipeline having an orifice, a valve or the like, a liquid passes through the inner space at a high speed, and accordingly, in such case, it is necessary to take measures against erosion, corrosion, flow-accelerated-type corrosion and the like.

These are representative phenomena occurring in high-temperature water environment, and exert various influences such as a problem on an operation caused by corrosion and increase of maintenance frequency on the piping and other members including the structural material. In addition, in recent years, such a phenomenon occurs in a carbon steel pipe that the thickness of the pipe decreases due to a wall-thinning phenomenon. Thus, the elution, the corrosion phenomenon and the like of metal are gradually accumulated during a plant operation in a long period of time, and potentially show a possibility of suddenly erupting into a disaster at some point.

In any power plant, in a pipeline on a downstream side of a condenser, iron and the like elute, and in a pipe disposed downstream side of a deaerator, the temperature rises and a condition of causing the flow-accelerated-type corrosion is formed. Because of this reason, the suppression of these phenomena leads to the enhancement of the soundness and the operation period of equipment. The method of suppressing the above descried phenomenon includes injecting a chemical agent having a corrosion-suppressing effect into the system to impart a quality of causing little corrosion to the water, for example, in the thermal power plant, the PWR power plant and the like.

For example, in a secondary system of the thermal power plant or the pressurized-water-type nuclear power plant, pH control or water quality control has been performed by injecting ammonia for reducing the elution of iron from the inside of the system and preventing the inflow of the iron to the steam generator. Furthermore, in order to eliminate the alkali concentration of the crevice portion in the steam generator, various water quality controls are implemented in an actual plant, such as an Na/Cl ratio control and a chloride ion concentration control for reducing an influence of a chlorine ion on corrosion. In recent years, the water-quality control method has been adopted by using improved chemicals such as ethanolamine and morpholine.

As for the improvement of chemicals to be injected, there is provided a method of utilizing an organic acid such as tannic acid and ascorbic acid as an oxygen scavenger (for example, as disclosed in Japanese Patent Laid-Open Publication No. 4-26784: Patent Document 1). In addition, as for the water-quality control method, there are proposed an operation method of controlling a molar ratio of all cations/$SO_4$, a method of introducing at least one of a calcium compound and a magnesium compound into feed water to a steam generator for a nuclear reactor so that the ion concentration becomes 0.4 to 0.8 ppb (for example, as disclosed in Japanese Patent Laid-Open Publication No. 2004-12162: Patent Document 2), and the like. In addition, a technology for injecting a precious metal for protecting a material and injecting oxygen is also proposed (for example, as disclosed in Japanese Patent Laid-Open Publication No. 10-339793: Patent Document 3).

However, the methods of controlling the water quality proposed in the Patent Documents 1 and 2 inject the chemical agent into the feed water of the pressurized-water-type nuclear power plant, and accordingly, this technology may apply an influence upon the purity of the feed water, the environment and the like.

Furthermore, although the method of controlling the water quality disclosed in the Patent Document 3 shows clear criteria for the injection of the precious metal such as platinum (Pt) and ruthenium (Ru), there is no disclosure concerning a necessary injection amount and an injection method for a metal compound such as titanium oxide ($TiO_2$).

DISCLOSURE OF THE INVENTION

The present invention was conceived in consideration of the above circumstances, and an object of the present invention is to provide a plant operation method and a plant operation system, which can surely suppress the corrosion of a structural material such as a pipe or piping without injecting such a chemical agent as to exert an influence upon an environment therearound.

The above object of the present invention can be achieved by providing an operation method of any one of plants including: a secondary system of a pressurized-water-type nuclear power plant, which has at least a low-pressure feed water heater and a high-pressure feed water heater sequentially arranged in a feed water pipe reaching a steam generator from a condenser or further has a deaerator arranged between the low-pressure feed water heater and the high-pressure feed water heater, and leads high-temperature feed water to the steam generator; a primary system of a boiling-water-type nuclear power plant, which has a low-pressure feed water heater and a high-pressure feed water heater sequentially arranged in a feed water pipe reaching a pressure vessel from a condenser, and leads high-temperature feed water to the pressure vessel; and a feed water system of a thermal power plant which has at least a low-pressure feed water heater and a high-pressure feed water heater sequentially arranged in a feed water pipe reaching a boiler from a condenser, or further has a deaerator arranged between the low-pressure feed water heater and the high-pressure feed water heater, and leads high-temperature feed water to the pressure reaction vessel, wherein a film, for suppressing an elution of an element constituting a structural material such as the feed water pipe, the low-pressure feed water heater, the deaerator and the high-pressure feed water heater which come in contact with the high-temperature feed water, is formed on a surface of the structural material; and a corrosion suppression substance is deposited on the surface of the structural material in which the corrosion accelerated by a flow of the feed water occurs.

In addition, the above described object of the present invention is attained by providing, a secondary operation system of a pressurized-water type nuclear power plant which has a low-pressure feed water heater, a deaerator and a high-pressure feed water heater sequentially arranged in a feed water pipe reaching a steam generator from a condenser, and leads high-temperature feed water to the steam generator, wherein the plant operation system comprises: an oxidant injection unit which is provided in a downstream side of the condenser and in an upstream side of the low-pressure feed water heater in the feed water pipe, and injects an oxidant for forming a film that suppresses an elution of an element constituting a structural material such as the feed water pipe, the low-pressure feed water heater, the deaerator and the high-pressure feed water heater, which come in contact with the high-temperature feed water, onto a surface of the structural material; and a corrosion suppression substance introduction unit which is provided in a downstream side of the deaerator and in an upstream side of the high-pressure feed water heater in the feed water pipe, and introduces a corrosion suppression substance so as to deposit the corrosion suppression substance on the surface of the structural material in which corrosion accelerated by a flow of the feed water occurs.

Furthermore, the above described object of the present invention is attained by providing an operation system of a boiling-water-type nuclear power plant which has a low-pressure feed water heater and a high-pressure feed water heater sequentially arranged in a feed water pipe reaching a pressure reaction vessel from a condenser, and leads high-temperature feed water to the steam generator, or a thermal power plant which has a low-pressure feed water heater and a high-pressure feed water heater sequentially arranged in a feed water pipe reaching a boiler from a condenser, and leads high-temperature feed water to the boiler, wherein the operation system of the plant includes an injection unit which is provided in a downstream side of the condenser and in an upstream side of the low-pressure feed water heater in the feed water pipe, and injects an oxidant for forming a film which suppresses an elution of an element constituting a structural material such as the feed water pipe, the low-pressure feed water heater and the high-pressure feed water heater, which come in contact with high-temperature feed water, onto a surface of the structural material, or injects a corrosion suppression substance for depositing the corrosion suppression substance onto the surface of the structural material.

According to the plant operation method and the plant operation system of the present invention, a film for suppressing the elution of the element constituting the structural material is formed and the corrosion suppression substance is deposited on the surface of the structural material in which a flow-accelerated-type corrosion occurs, and the corrosion of the structural material such as the pipe can be thereby surely suppressed without injecting such a chemical agent as to exert an influence upon the environment and the like.

BEST MODE FOR EMBODYING THE INVENTION

Best modes or embodiments for carrying out the present invention will be described hereunder with reference to the drawings. It is however to be noted that the present invention is not limited to these modes or embodiments.

First Embodiment (FIG. 1 to FIG. 7)

Figure 1:
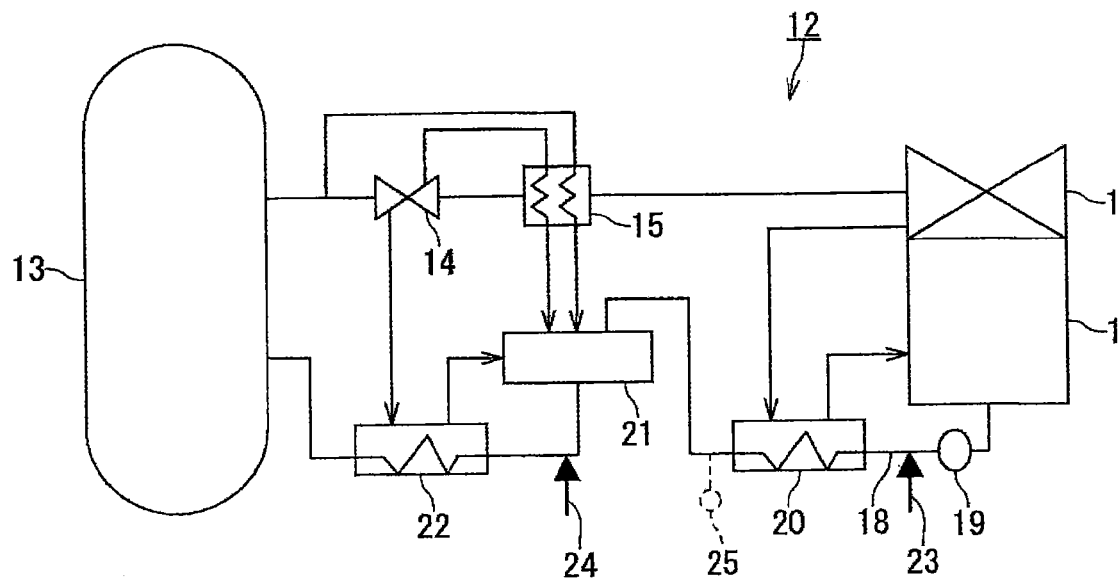
FIG. 1 is a schematic system diagram illustrating a secondary system of a pressurized-water-type nuclear power plant to which a first embodiment of the operation method of the secondary system of the pressurized-water-type nuclear power plant according to the present invention is applied.

FIG. 1 is a schematic system diagram illustrating a secondary system of a pressurized-water-type nuclear power plant to which a first embodiment of the operation method of a secondary system of the pressurized-water-type nuclear power plant according to the present invention has been applied.

As is illustrated in this FIG. 1, in the secondary system 12 of the pressurized-water-type nuclear power plant, a steam which has been generated in a steam generator 13 is introduced into a high-pressure turbine 14, works there, then is subjected to a moisture separation by a moisture separation/heating apparatus 15, then heated and finally introduced into a low-pressure turbine 16 and works there. The steam which has worked in the low-pressure turbine 16 is condensed in a condenser 17 to become condensed water. In a feed water pipe 18 reaching the steam generator 13 from the condenser 17, a condensate pump 19, a low-pressure feed water heater 20, a deaerator 21 and a high-pressure feed water heater 22 are sequentially arranged. On such occasion, however, the deaerator 21 may not be arranged therein. The condensed water discharged from the condenser 17 becomes feed water, is heated by the low-pressure feed water heater 20, the deaerator 21 and the high-pressure feed water heater 22, becomes a high-temperature state, and is introduced into the steam generator 13.

The temperature of the feed water flowing in the inside of the feed water pipe 18 reaching the steam generator 13 from the condenser 17 is 15° C. or higher and 350° C. or lower. For example, the temperature of the feed water passing to the low-pressure feed water heater 20 from the condenser 17 is approximately 40° C. to 180° C., and the temperature of the feed water passing to the high-pressure feed water heater 22 from the deaerator 21 is approximately 180° C. to 230° C. The flow velocity of the feed water flowing in the inside of the feed water pipe 18 which reaches the steam generator 13 from the condenser 17 is in the range of 1 m/sec. or more and 20 m/sec. or less.

A structural material of various equipments and pipes constituting this secondary system 12, particularly, the feed water pipe 18, the condensate pump 19, the low-pressure feed water heater 20, the deaerator 21 and the high-pressure feed water heater 22, which come in contact with high-temperature feed water are formed of a material of steel such as stainless steel, a non-ferrous material such as a nickel-based alloy or a non-ferrous metal such as copper and aluminum.

In the secondary system 12, an oxidant injection line 23 working as an oxidant injection unit is installed at a position in a downstream side of the condenser 17 and in an upstream side of the low-pressure feed water heater 20 in the feed water pipe 18, for example, in the vicinity of a downstream side of the condensate pump 19. Oxygen (gaseous state), hydrogen peroxide (liquid state) and ozone (gaseous state) are injected singularly or in a mixed state as an oxidant from the oxidant injection line 23. In the present embodiment, oxygen in a gaseous state is injected into the feed water in the feed water pipe 18 from the oxidant injection line 23. In order to facilitate the oxygen to be dissolved into the feed water, the bubble of the oxygen is fined to thereby enable the amount of dissolved oxygen to increase. For example, a nano-bubble is preferable.

By the injection of this oxidant (oxygen, for example), the dissolved oxygen concentration of water qualities of the feed water rises, and an oxide film, which suppresses the elution of elements constituting the structural material, for example, iron, chromium and the like, is formed on the surface to come in contact with feed water of the structural material such as the feed water pipe 18.

Figure 2:
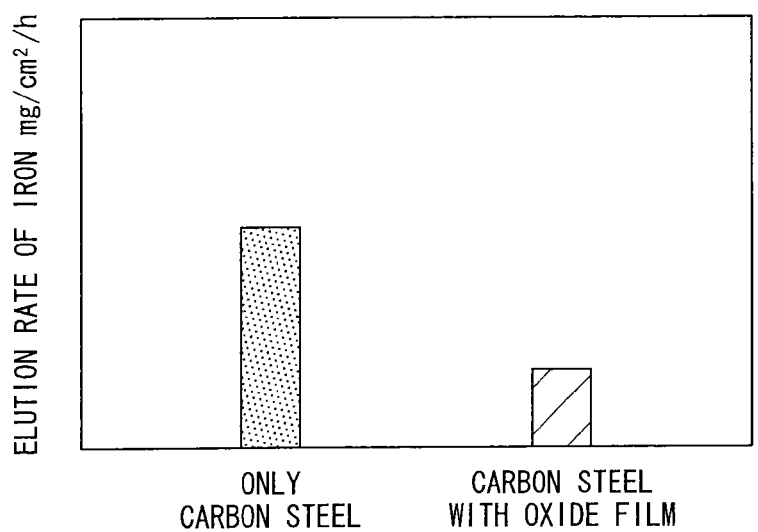
FIG. 2 is a graph illustrating a result of a test of suppressing elution of iron in a case of carbon steel having an oxide film formed on a surface thereof and a case of only carbon steel.

Herein, a result of a test on the effect of suppressing an elution of an element (iron, for example) constituting the structural material due to the oxide film will be described below with reference to FIG. 2.

In this test, in order to produce the oxide film on the surface of the carbon steel, a test piece was produced by exposing a carbon steel in high-temperature (40 to 180° C., for example) water having a dissolved oxygen concentration of 200 ppb for 500 hours. The test of iron elution was conducted by using the produced test piece and a test piece of only the carbon steel. The test was conducted on a test condition of immersing both of the test pieces in an aqueous solution in which the dissolved oxygen concentration was adjusted to less than 5 ppb and the pH was adjusted to 9 to 10 by ammonia.

As for the test piece of only the carbon steel having no oxide film thereon, iron eluted and the color of the solution changed. On the other hand, as for the test piece of the carbon steel provided with the oxide film thereon, the color hardly changed, and the surface state also did not show a change. Thus, the elution of the iron is suppressed and the amount of the iron to be introduced into the steam generator 13 is reduced, by the existence of the stable oxide film.

Furthermore, in a secondary system 12 of this pressurized-water-type nuclear power plant, a corrosion suppression substance introduction line 24 working as a corrosion suppression substance introduction unit is installed at a position in a downstream side of the deaerator 21 and in an upstream side of the high-pressure feed water heater 22 in the feed water pipe 18. The corrosion suppression substance is, for example, an oxide or a hydroxide containing one or more elements selected from titanium (Ti), zirconium (Zr), cerium (Ce), niobium (Nb), lanthanum (La), neodymium (Nd) and yttrium (Y). The corrosion suppression substance is specifically titanium oxide ($TiO_2$), zirconium oxide ($ZrO_2$), cerium oxide ($CeO_2$), niobium oxide ($Nb_2O_5$), lanthanum trioxide ($La_2O_3$), oxidization neodymium ($Nd_2O_3$), yttrium oxide ($Y_2O_3$), hydroxylation cerium ($Ce(OH)_4$), lanthanum hydroxide ($La(OH)_3$), hydroxylation yttrium ($Y(OH)_3$) or the like. Among these corrosion suppression substances, the titanium oxide may be more preferable.

The structural material including the feed water pipe 18 and the high-pressure feed water heater 22 in a downstream side of the deaerator 21 comes in contact with the feed water of high temperature and is in a region in which the corrosion (flow-accelerated-type corrosion) accelerated by a flow of the feed water occurs. It becomes possible to deposit the corrosion suppression substance including the titanium oxide on the surface of the structural material, in which the flow-accelerated-type corrosion occurs, by introducing the corrosion suppression substance including the titanium oxide from the corrosion suppression substance introduction line 24.

Further, in a case where no deaerator 21 is disposed, the corrosion suppression substance introduction line 24 can be installed at a position in a downstream side of the condenser 17 and in an upstream side of the low-pressure feed water heater 20, and accordingly, can be united with the oxidant injection line 23 to form the same line.

This corrosion suppression substance is in a colloidal state or slurry state of a solution containing fine particles, and the fine particles are deposited on the surface of the structural material such as the feed water pipe 18 by injecting this solution into the feed water or are deposited on the surface of the structural material by a spraying or thermal spraying technique. In the present embodiment, particularly, the titanium oxide solution is injected into the feed water. It is preferable to deposit 5 $\mu g/cm^2$ or more of the corrosion suppression substance including the titanium oxide on the surface of the structural material.

When the corrosion suppression substance including the titanium oxide is injected into the feed water, the amount of the corrosion suppression substance to be deposited on the structural material is controlled by selecting the concentration of the solution containing the corrosion suppression substance, adjusting the amount of the solution to be injected, and further considering the water quality (dissolved oxygen concentration, for example) of the feed water into which the solution has been injected.

When the corrosion suppression substance including the titanium oxide is deposited on the surface of the structural material under high temperature and high pressure, the corrosion suppression substance shows a catalytic action of promoting the oxidation reaction of water in place of the elution (specifically, oxidation reaction of iron, chromium and the like) of elements (iron, chromium and the like, for example) constituting the structural material, thereby suppresses the elution of the elements constituting the structural material including the iron, the chromium and the like, and also prevents the exfoliation of the above described oxide film which has been deposited on the surface of the structural material.

Although this corrosion suppression substance including the titanium oxide preferably should cover the whole surface which comes in contact with the feed water in the structural material including the feed water pipe 18, it is not necessarily need to cover the above described whole surface because the corrosion suppression substance has a function as a catalyst.

Herein, the test result (FIG. 3) on the flow-velocity dependency of corrosion, the test result (FIG. 4) on the temperature dependency of the corrosion, and the test result (FIG. 5) on the effect of suppressing the corrosion will be described below.

Figure 3:
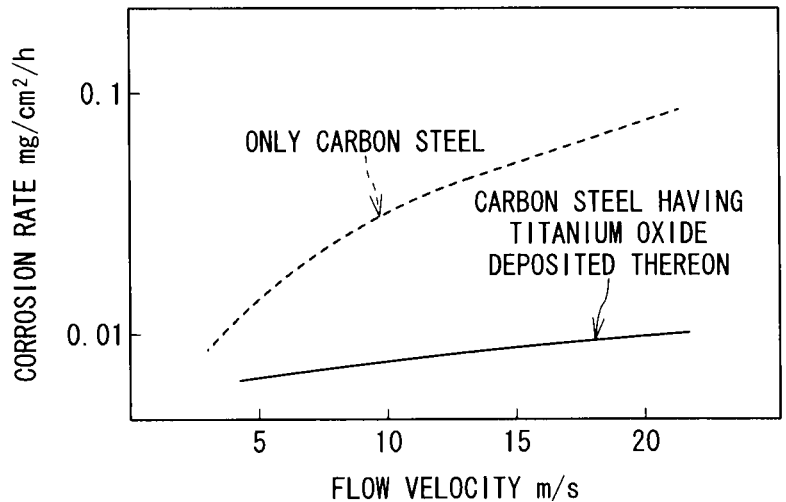
FIG. 3 is a graph illustrating flow-velocity dependency of corrosion in a case of carbon steel having titanium oxide deposited on a surface thereof and a case of only carbon steel.

FIG. 3 illustrates the flow-velocity dependency of the corrosion of carbon steel in an aqueous solution of 150° C., of which the pH was adjusted to 9 to 10, and the dissolved oxygen concentration was controlled to 2 ppb or less by hydrazine. As for the test piece of only the carbon steel, as the flow velocity increases, the corrosion rate increases. In comparison, as for the test piece having the titanium oxide deposited thereon, the increasing rate of corrosion with respect to the flow velocity is suppressed. Thus, if the flow velocity is 1 m/sec or more and 20 m/sec or less, the effect of suppressing the corrosion can be expected by depositing the titanium oxide on the surface of the carbon steel.

Figure 4:
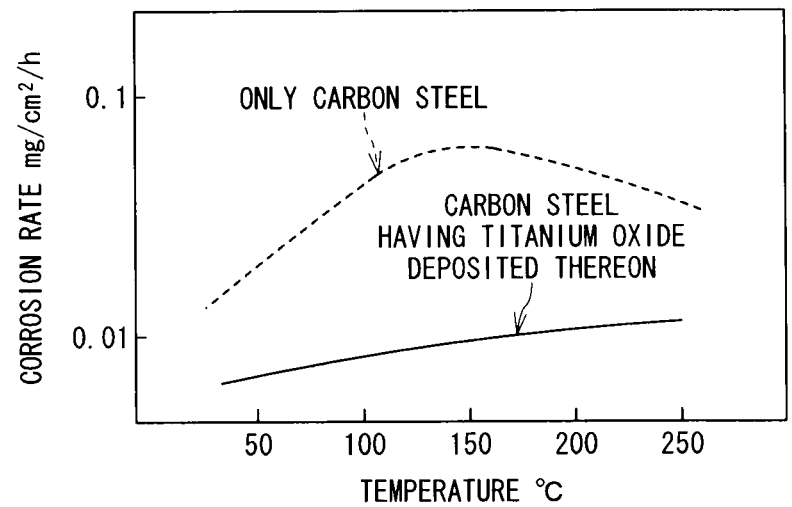
FIG. 4 is a graph illustrating a temperature dependency of corrosion in a case of carbon steel having titanium oxide deposited on a surface thereof and a case of only carbon steel.

FIG. 4 illustrates a result of the test conducted by using a test piece of only a carbon steel and a test piece of a carbon steel having titanium oxide deposited on its surface, and using an aqueous solution of which the pH was adjusted to 9 to 10 and the dissolved oxygen concentration was controlled to 2 ppb or less by hydrazine, on the condition of the flow velocity of 15 m/sec. The test piece of only the carbon steel shows characteristic properties on the dependency of the corrosion rate with respect to the temperature, and the corrosion rate increases in the vicinity of approximately 140 to 150° C.

On the other hand, as for the test piece of the carbon steel having the titanium oxide deposited thereon, the corrosion rate is reduced, and the dependency with respect to the temperature becomes small. The test piece of the carbon steel having the titanium oxide deposited thereon shows the effect of suppressing the corrosion in a low-temperature region and in a high-temperature region, and shows the effect for a pipe having a temperature gradient, for example. From the above results, it is found that at least the titanium oxide can provide the effect of suppressing the corrosion for the whole of the secondary system 12 of the pressurized-water type nuclear power plant.

Figure 5:
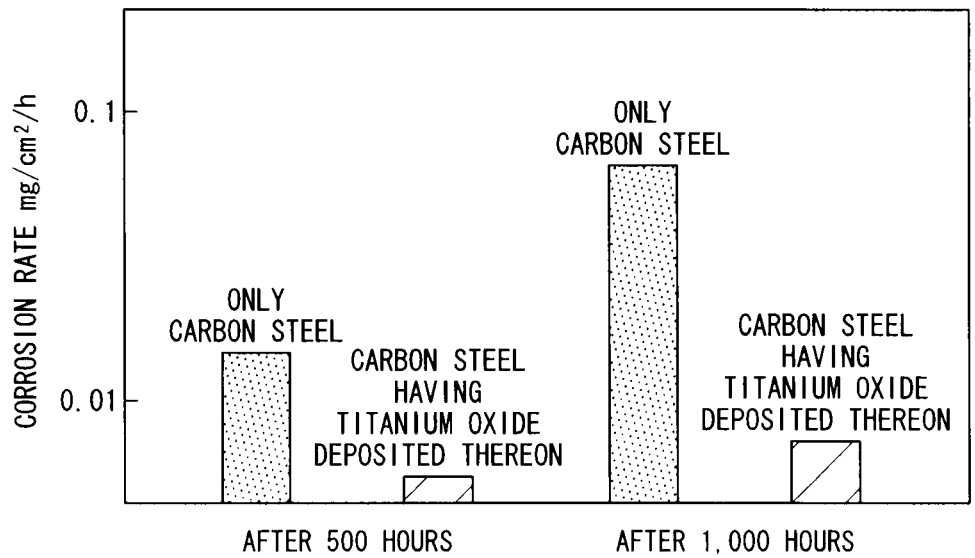
FIG. 5 is a graph illustrating a result of a corrosion suppression test in a case of carbon steel having titanium oxide deposited on a surface thereof and a case of only carbon steel.

FIG. 5 illustrates a result of a corrosion suppression test in which corrosion rates were determined by using a test piece of only carbon steel and a test piece of carbon steel having titanium oxide deposited on its surface. Both of the test pieces were immersed in an aqueous solution in which the flow velocity was approximately 15 m/sec, the temperature was 150° C. and the dissolved oxygen concentration was less than 5 ppb, for 500 hours and 1,000 hours, respectively. In this case, the aqueous solution was in the environment in which the oxygen amount was sufficiently low and the oxide film resisted being formed on the surface of the carbon steel. The corrosion rate of the test piece of the carbon steel having the titanium oxide deposited thereon shows a smaller value than the corrosion rate of the test piece of only the carbon steel, in the case of 500 hours and also in the case of 1,000 hours. Accordingly, the corrosion, particularly, the flow-accelerated-type corrosion of the carbon steel can be suppressed by depositing the titanium oxide on the carbon steel, even in the environment in which an oxidant such as oxygen is not injected. The necessary amount of the titanium oxide in this case is 5 $\mu g/cm^2$ or more.

Figure 6:
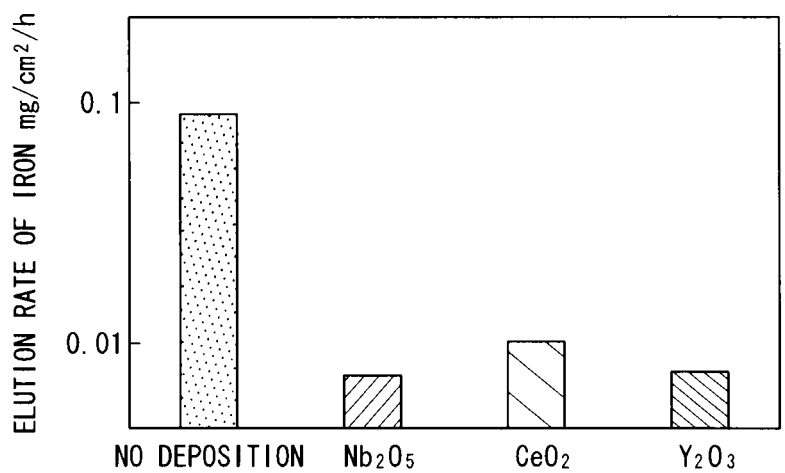
FIG. 6 is a graph illustrating a result of a corrosion suppression test in a case of carbon steels having niobium oxide, cerium oxide and yttrium oxide deposited respectively thereon and a case of only carbon steel.

Furthermore, a result of a corrosion suppression test about a corrosion suppression substance other than the titanium oxide is shown in FIG. 6. FIG. 6 is a result of an elution suppression test conducted by using test pieces of a carbon steel, which have 50 $\mu g/cm^2$ of niobium oxide ($Nb_2O_5$), cerium oxide ($CeO_2$) and yttrium oxide ($Y_2O_3$) in place of titanium oxide, respectively deposited on the surfaces by injecting the compounds into high-temperature water. It is understood that by the deposition of the above described oxide working as the corrosion suppression substance onto carbon steel, the rate of iron eluting from the test piece is decreased in comparison with the case of only the carbon steel, similarly to the case of the titanium oxide. A similar test result is obtained also as to oxidization neodymium ($Nd_2O_3$), zirconium oxide ($ZrO_2$) and lanthanum trioxide ($La_2O_3$).

On the other hand, in the secondary system 12 of the pressurized-water-type nuclear power plant, each of the above described substances (particularly, yttrium, cerium and lanthanum) is injected in a state of hydroxide and is deposited on the carbon steel, and an oxidant such as oxygen is injected from the oxidant injection line 23 while this secondary system 12 is operated. According to such injection, the deposited hydroxide is oxidized by the oxidant and is formed as an oxide. Further, the corrosion suppression effect becomes higher by depositing the corrosion suppression substance on the surface of the structural material such as the feed water pipe 18 in a state having a high adhesive property such as hydroxide and by oxidizing the corrosion suppression substance.

In the secondary system 12 of the pressurized-water-type nuclear power plant, a downstream side of the deaerator 21 is in a state of a higher temperature than that in an upstream side thereof, is in a region in which the flow-accelerated-type corrosion occurs as described above, and is in the environment in which the oxide film resists being formed.

Then, an oxidant such as oxygen is injected into the feed water in a structural material including the feed water pipe 18 in a downstream side of this deaerator 21 from the oxidant injection line 23 so that the dissolved oxygen concentration in the feed water becomes 5 ppb or more. According to such injection of the oxidant, it becomes possible to surely form an oxide film on the surface which comes in contact with the feed water of the structural material in a downstream side of the deaerator 21 and to deposit a corrosion suppression substance (titanium oxide, for example) injected from the corrosion suppression substance introduction line 24 on this oxide film. Thus, the corrosion suppression effect for the structural material increases, and accordingly, the amount of the corrosion suppression substance depositing on the surface of the structural material does not necessarily need to be 5 $\mu g/cm^2$ or more.

Figure 7:
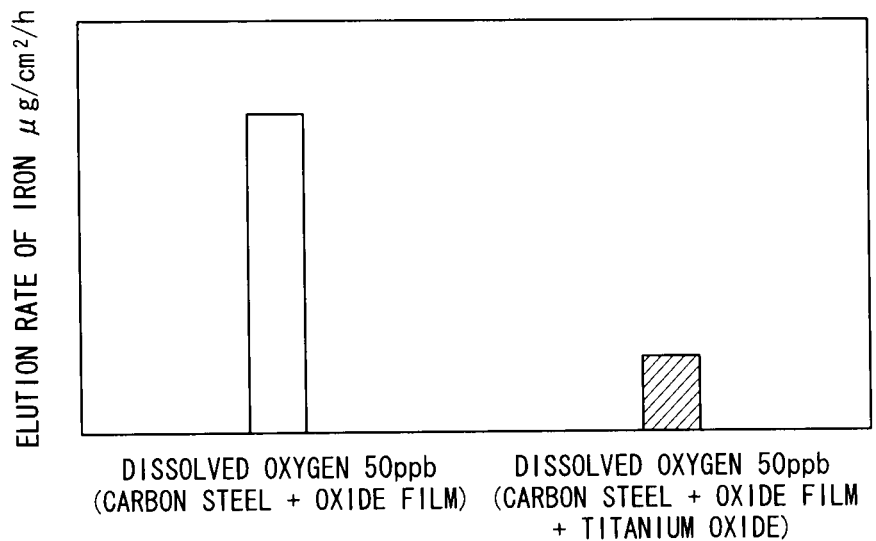
FIG. 7 is a graph illustrating a result of an elution suppression test of iron in a case of carbon steel having an oxide film and titanium oxide provided on a surface thereof and a case of carbon steel having an oxide film provided on a surface thereof.

FIG. 7 illustrates a result of an elution suppression test conducted by immersing a test piece of a carbon steel having an oxide film formed on its surface in an oxidizing atmosphere, and a test piece having titanium oxide deposited on this oxide film into an aqueous solution having a dissolved oxygen concentration of 50 ppb, neutrality and a temperature of 150° C. The titanium oxide was deposited by spraying, and the deposition amount was 50 μg/cm². It is understood from the test result that the elution rate of the test piece having the titanium oxide deposited thereon is reduced in comparison with the test piece having only the oxide film thereon. The corrosion is surely suppressed by the combination of the oxide film and the titanium oxide.

Accordingly, the present embodiment attains the following effects. Specifically, the present embodiment can surely suppress corrosion phenomena such as the flow-accelerated-type corrosion, corrosion caused by the difference of partial environments and uniform corrosion which are a concern in the secondary system 12 of the pressurized-water-type nuclear power plant, by forming an oxide film for suppressing an elution of an element constituting the structural material such as the feed water pipe 18, and depositing a corrosion suppression substance (titanium oxide, for example) on the surface of the structural material in which the flow-accelerated-type corrosion occurs. On this occasion, it is not necessary to inject a chemical agent like amines such as ammonia and hydrazine that is a powerful drug, which exerts an influence on the environment into the feed water.

As a result of thus suppressing the corrosion of the structural material such as the feed water pipe 18, the present embodiment can reduce the amount of elements which have eluted from the structural material and flow into the steam generator 13 to thereby suppress the deposition of scale and crud onto the steam generator 13. Accordingly, the present embodiment can reduce the necessary number of works for removing the scale and the crud in the steam generator 13, and can reduce costs for operation, maintenance and the like.

Figure 8:
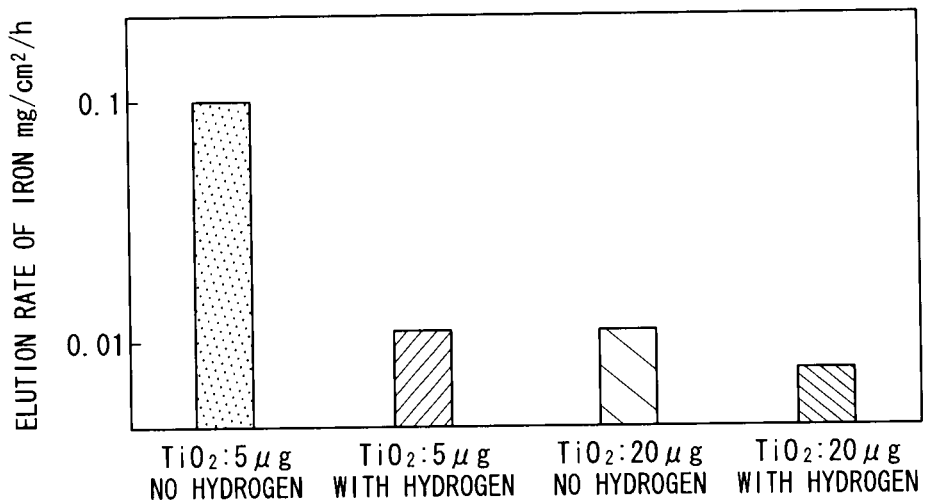
FIG. 8 is a graph illustrating hydrogen dependency of iron elution in a case to which a second embodiment of the operation method of a secondary system of a pressurized-water-type nuclear power plant according to the present invention is applied.

Second Embodiment (FIG. 1 and FIG. 8)

FIG. 8 is a graph illustrating a hydrogen dependency of iron elution in the cases to which a second embodiment of the operation method of the secondary system of the pressurized-water-type nuclear power plant according to the present invention is applied. In the second embodiment, the same portions as in the first embodiment will be designated by the same reference numerals as in FIG. 1, and the description will be simplified or omitted.

A point in the present embodiment different from the first embodiment resides in injection of hydrogen into feed water, in addition to the injection of an oxidant such as oxygen from the oxidant injection line 23 into the feed water flowing through the structural material such as the feed water pipe 18, and deposition of a corrosion suppression substance such as titanium oxide injected from the corrosion suppression substance introducing line 24 on the surface to come in contact with the feed water of the structural material.

The hydrogen may be injected into the same position as the oxidant injection line 23 or the corrosion suppression substance introducing line 24 in the feed water pipe 18, or may also be injected into another position than the oxidant injection line 23 and the corrosion suppression substance introducing line 24. The hydrogen is preferably injected into the same position as the corrosion suppression substance introducing line 24 or into the vicinity thereof.

The hydrogen which has been dissolved in the feed water is oxidized by a catalytic action of the corrosion suppression substance such as titanium oxide, and suppresses the elution (in other words, oxidation reaction) of elements (iron, chromium and the like) constituting the structural material such as the feed water pipe 18. This oxidation reaction of hydrogen can suppress the elution of the element constituting the structural material by a smaller deposition amount of the corrosion suppression substance than that in the case of the above described reaction of oxidizing water in the first embodiment.

As is shown in FIG. 8, the elution rates of iron in the carbon steel are compared between a test piece of a carbon steel having 5 μg/cm² of titanium oxide deposited thereon and a test piece of a carbon steel having 20 μg/cm² of titanium oxide deposited thereon, and between the case when the test pieces are immersed in an aqueous solution in which hydrogen is injected and the dissolved hydrogen concentration is approximately 10 ppb and the case when the test pieces are immersed in an aqueous solution to which the hydrogen is not injected. It is understood from the graph of FIG. 8 that in the case of the aqueous solution to which the hydrogen has been injected, even when the amount of the deposited titanium oxide is small, the elution rate of iron can be lowered.

Thus, even when the deposition amount of the corrosion suppression substance such as titanium oxide is reduced, the effect of suppressing the corrosion of the structural material is developed by the injection of hydrogen. For example, by injecting hydrogen into the feed water so that the dissolved hydrogen concentration of the feed water is 1 ppb or more (approximately 10 ppb, for example), the corrosion suppression effect can be sufficiently developed, even when the deposition amount of the corrosion suppression substance such as titanium oxide is controlled to 5 μg/cm² or less.

Accordingly, the present embodiment attains the following effects in addition to the same effect as that attained by the first embodiment. Specifically, the deposition amount of the corrosion suppression substance such as titanium oxide necessary for suppressing the corrosion of the structural material such as the feed water pipe 18 can be decreased by injecting hydrogen into the feed water.

Figure 9:
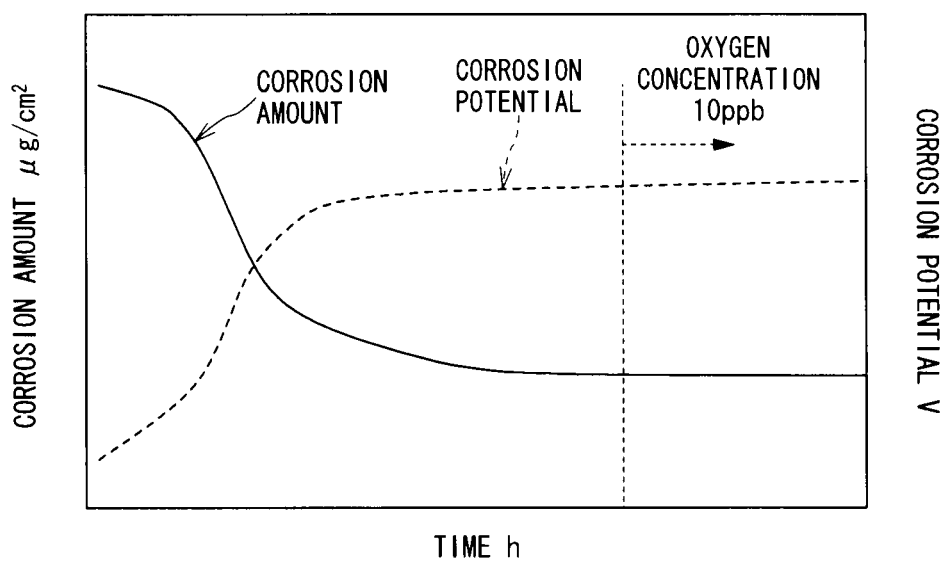
FIG. 9 is a graph illustrating a relationship between a corrosion amount and corrosion potential in a case to which a third embodiment in the operation method of a secondary system of a pressurized-water-type nuclear power plant according to the present invention is applied.

Third Embodiment (FIG. 1 and FIG. 9)

FIG. 9 is a graph representing a relationship between a corrosion amount and a corrosion potential in the case to which a third embodiment of the operation method of the secondary system of the pressurized-water-type nuclear power plant according to the present invention is applied. In the third embodiment, the same portions as those in the first embodiment will be designated by the same reference numerals as in FIG. 1, and the description will be simplified or omitted.

The third embodiment differs from the first embodiment in a point of monitoring the corrosion potential of the surface to come in contact with the feed water of the structural material, for example, of the feed water pipe 18, to thereby control the amount of an oxidant such as oxygen to be injected into the feed water from the oxidant injection line 23.

FIG. 9 represents a relationship between the corrosion amount (amount of eluted iron) and the corrosion potential of the surface of a test piece, based on an elution test conducted by immersing the test piece of carbon steel in an aqueous solution of 150° C. with a dissolved oxygen concentration of 50 ppb. The corrosion potential remains low at the beginning, and then rises along with the formation of the oxide film. On the other hand, it is understood that the corrosion amount is large at the beginning, but because the corrosion potential rises along with the formation of the oxide film, the corrosion amount then gradually in accordance with the rising of the corrosion potential.

In the secondary system 12 of the pressurized-water-type nuclear power plant illustrated in FIG. 1, an oxidant such as oxygen is injected into feed water from the oxidant injection line 23 to thereby form an oxide film on the surface of a structural material so as to come in contact with the feed water. At this time, a corrosion potentiometer 25 measures and monitors the change of the corrosion potential of the above described surface of the structural material (feed water pipe 18, for example). When the corrosion potential has sufficiently risen, a necessary amount of the oxide film is formed on the surface of the structural material, and even when the dissolved oxygen concentration in the feed water decreases (decrease to 10 ppb from 50 ppb in FIG. 9, for example), the corrosion amount of the structural material does not change. Because of this fact, at the time when the corrosion potential of the surface of the structural material (feed water pipe 18, for example) to be measured by the corrosion potentiometer 25 has sufficiently risen, the amount of an oxidant (oxygen, for example) to be injected from the oxidant injection line 23 is reduced or stopped.

Accordingly, the present embodiment attains the following effects, in addition to an effect similar to that in the first embodiment. Specifically, by monitoring the corrosion potential of the surface of the structural material such as the feed water pipe 18 and controlling the amount of the oxidant to be injected into the feed water, the amount of the oxidant to be used can be reduced and the operation cost can be reduced.

Figure 10:
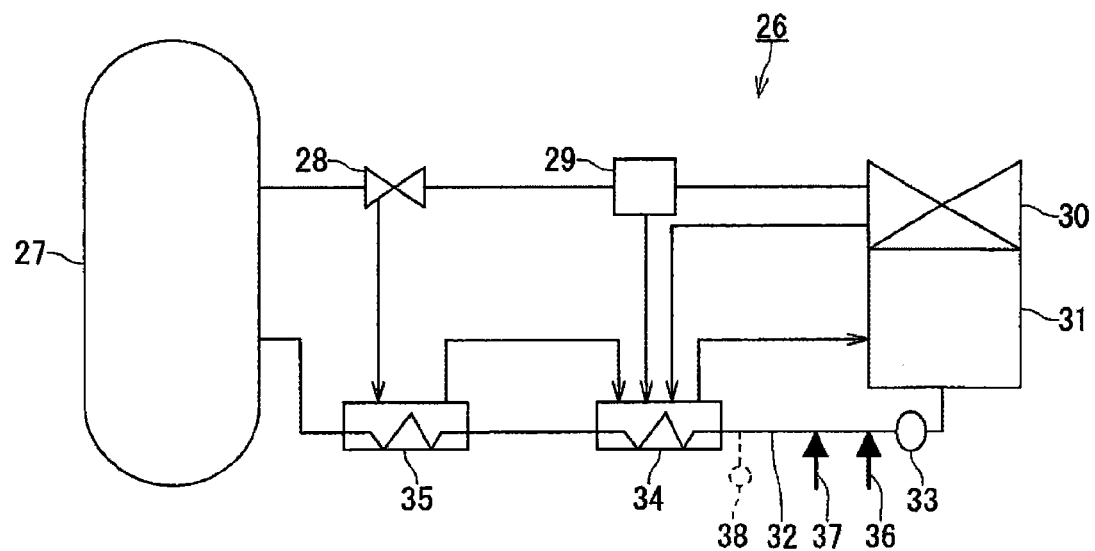
FIG. 10 is a schematic system diagram illustrating a boiling-water-type nuclear power plant in a case to which a fourth embodiment of the operation method of the pressurized-water-type nuclear power plant according to the present invention is applied.

Fourth Embodiment (FIG. 10)

FIG. 10 is a schematic system diagram of a boiling-water type nuclear power plant in the case to which a fourth embodiment in the operation method of the boiling-water-type nuclear power plant according to the present invention is applied.

As is illustrated in this FIG. 10, in the boiling-water-type nuclear power plant 26, the steam which has been generated in a pressure vessel 27 is introduced into a high-pressure turbine 28, works there, then is subjected to a moisture removal by the moisture separator 29, is heated, then is introduced into a low-pressure turbine 30 and works there. The steam which has worked in this low-pressure turbine 30 is condensed by a condenser 31 to become condensed water. In a feed water pipe 32 reaching the pressure vessel 27 from the condenser 31, a condensate pump 33, a low-pressure feed water heater 34 and a high-pressure feed water heater 35 are sequentially arranged.

The condensed water discharged from the condenser 31 becomes feed water, is heated by the low-pressure feed water heater 34 and the high-pressure feed water heater 35 to become a high-temperature state, and is introduced into the pressure vessel 27.

The temperature of the feed water flowing in the inside of the feed water pipe 32 which reaches the pressure vessel 27 from the condenser 31 is 15° C. or higher and 320° C. or lower. Furthermore, the flow velocity of the feed water flowing in the inside of the feed water pipe 32 which reaches the pressure vessel 27 from the condenser 31 is in the range of 1 m/sec or more and 20 m/sec or less.

A structural material composing various equipments and pipes constituting this boiling-water-type nuclear power plant 26, particularly, the feed water pipe 32, the condensate pump 33, the low-pressure feed water heater 34, and the high-pressure feed water heater 35, which come in contact with high-temperature feed water, are composed from a material of steel such as stainless steel, a non-ferrous material such as a nickel-based alloy or a non-ferrous metal such as copper and aluminum.

As was described above, the boiling-water-type nuclear power plant satisfies a condition that the present invention can be applied thereto, similarly to the secondary system of the pressurized-water-type nuclear power plant. Accordingly, by installing an oxidant injection line 36 working as an oxidant injection unit at a position in a downstream side of the condenser 31 and in an upstream side of the low-pressure feed water heater 34 in the feed water pipe 32, for example, in the vicinity of a downstream side of the condensate pump 33, and injecting an oxidant (oxygen, for example) into the feed water from the oxidant injection line 36, similarly to that in the operation method of the secondary system of the pressurized-water-type nuclear power plant shown in the first embodiment, the dissolved oxygen concentration among the water qualities of the feed water rises, and the oxide film which suppresses the elution of an element constituting this structural material, for example, iron, chromium or the like, is formed on the surface to come in contact with the feed water of the structural material such as the feed water pipe 32.

At the same time, in this boiling-water type nuclear power plant 26, a corrosion suppression substance introduction line 37 working as a corrosion suppression substance introduction unit is installed at a position in a downstream side of the condenser 31 and in an upstream side of the low-pressure feed water heater 34 in the feed water pipe 32, for example, in the vicinity of a downstream side of the condensate pump 33. Further, although the above described oxidant injection line 36 and the corrosion suppression substance introduction line 37 do not need to be individually installed, the oxidant injection line 36 may also be composed of the same injection line.

The structural material including the feed water pipe 32 in a downstream side of the low-pressure feed water heater 34, the low-pressure feed water heater 34 and the high-pressure feed water heater 35 is a region in which the corrosion (flow-accelerated-type corrosion) accelerated by a flow of the feed water occurs.

It becomes possible to deposit the corrosion suppression substance including the titanium oxide on the surface of the structural material in which the flow-accelerated-type corrosion occurs, by introducing the corrosion suppression substance including the titanium oxide into the feed water from the corrosion suppression substance introduction line 37.

When the corrosion suppression substance including the titanium oxide is deposited on the surface of the structural material under high temperature and high pressure, the corrosion suppression substance achieves a catalytic action of promoting the oxidation reaction of water in place of the elution (specifically, oxidation reaction of iron, chromium and the like) of elements (iron, chromium and the like, for example) constituting the structural material, thereby suppressing the elution of the elements constituting structural material including the iron and the chromium and preventing the exfoliation of the above described oxide film which has been deposited on the surface of the structural material.

Furthermore, similarly to the second embodiment to be conducted in the secondary system 12 of the pressurized-water-type nuclear power plant, it becomes possible to suppress the elution of the element constituting the structural material, by injecting hydrogen into the feed water from the corrosion suppression substance introduction line 37, in addition to the deposition of the corrosion suppression substance such as titanium oxide injected from the corrosion suppression substance introduction line 37 on the surface of the structural material.

Furthermore, similarly to the third embodiment to be conducted in the secondary system 12 of the pressurized-water-type nuclear power plant, it is possible to reduce the amount of a used oxidant and reduce the operation cost, in addition to depositing the corrosion suppression substance such as titanium oxide injected from the corrosion suppression substance introduction line 37 on the surface of the feed water pipe 32 and the like, by injecting the oxidant into the feed water from the oxidant injection line 36 to form the oxide film on the surface of the structural material to come in contact with the feed water and controlling the amount of the oxidant to be injected by using a corrosion potentiometer 38 which measures the change of the corrosion potential of the surface of the feed water pipe 32 and the like.

Figure 11:
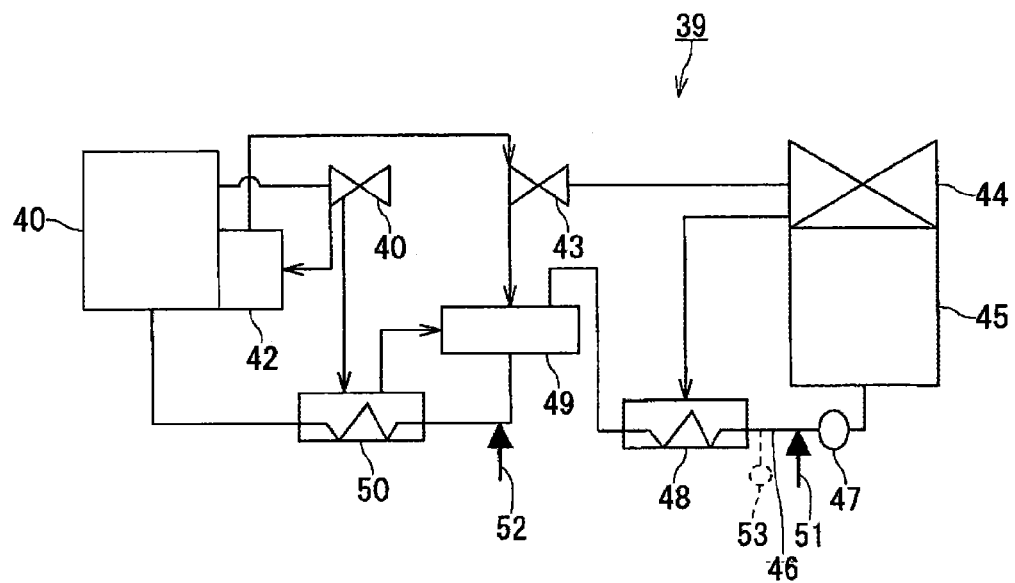
FIG. 11 is a schematic system diagram illustrating a thermal power plant to which a fifth embodiment of the operation method of the thermal power plant according to the present invention is applied.

Fifth Embodiment (FIG. 11)

FIG. 11 is a schematic system diagram of a thermal power plant to which a fifth embodiment in the operation method of the thermal power plant according to the present invention is applied.

As is illustrated in this FIG. 11, in the thermal power plant 39, the steam which has been generated in a boiler 40 is introduced into a high-pressure turbine 41, works there, is heated in a reheater 42, then is introduced into an intermediate pressure turbine 43 and works there. The steam which has worked in the intermediate pressure turbine 43 further works in a low-pressure turbine 44, and the generated steam is condensed in a condenser 45 to become condensed water. In a feed water pipe 46 reaching the boiler 40 from the condenser 45, a condensate pump 47, a low-pressure feed water heater 48, a deaerator 49 and a high-pressure feed water heater 50 are sequentially arranged. The condensed water discharged from the condenser 45 becomes feed water, is heated in the low-pressure feed water heater 48, the deaerator 49 and the high-pressure feed water heater 50 so as to become a high-temperature state, and is introduced into the boiler 40. In this arrangement, the deaerator 49 may be eliminated.

The temperature of the feed water flowing in the inside of the feed water pipe 46 which reaches the boiler 40 from the condenser 45 is 15° C. or higher and 320° C. or lower. Furthermore, the flow velocity of the feed water flowing in the inside of the feed water pipe 46 which reaches the boiler 40 from the condenser 45 is in the range of 1 m/sec or more and 20 m/sec or less.

A structural material of various equipments and pipes constituting this thermal power plant 39, particularly, the feed water pipe 46, the condensate pump 47, the low-pressure feed water heater 48, the deaerator 49 and the high-pressure feed water heater 50, which come in contact with high-temperature feed water, are composed from a material of steel such as stainless steel, a non-ferrous material such as a nickel-based alloy or a non-ferrous metal such as copper and aluminum.

As described above, since the thermal power plant satisfies a condition for being applied to the present invention, similarly to the secondary system of the pressurized-water-type nuclear power plant. Accordingly, by installing an oxidant injection line 51 working as an oxidant injection unit at a position in a downstream side of the condenser 45 and in an upstream side of the low-pressure feed water heater 48 in the feed water pipe 46, for example, in the vicinity of a downstream side of the condensate pump 47, and injecting an oxidant (oxygen, for example) into the feed water from the oxidant injection line 51, similarly to that in the operation method of the secondary system of the pressurized-water-type nuclear power plant shown in the first embodiment, the dissolved oxygen concentration among the water qualities of the feed water rises, and the oxide film which suppresses the elution of an element constituting this structural material, for example, iron, chromium or the like is formed on the surface to come in contact with the feed water of the structural material such as the feed water pipe 46.

At the same time, in this thermal power plant 39, a corrosion suppression substance introduction line 52 working as a corrosion suppression substance introduction unit is installed at a position in a downstream side of the deaerator 49 and in an upstream side of the high-pressure feed water heater 50 in the feed water pipe 46.

The structural material including the feed water pipe 46 and the high-pressure feed water heater 50 in a downstream side of the deaerator 49 is in a region in which the corrosion (flow-accelerated-type corrosion) accelerated by a flow of the feed water occurs. It becomes possible to deposit the corrosion suppression substance including titanium oxide on the surface of the structural material in which the flow-accelerated-type corrosion occurs, by introducing the corrosion suppression substance including the titanium oxide into the feed water from the corrosion suppression substance introduction line 52. In an arrangement of including no deaerator 49, the corrosion suppression substance introduction line 52 can be installed at a position in a downstream side of the condenser 45 and in an upstream side of the low-pressure feed water heater 48, thus being united with the oxidant injection line 51 to form the same line.

When the corrosion suppression substance including the titanium oxide is deposited on the surface of the structural material under high temperature and high pressure, and the corrosion suppression substance achieves a catalytic action of promoting the oxidation reaction of water in place of the elution (specifically, oxidation reaction of iron, chromium and the like) of elements (iron, chromium and the like, for example) constituting the structural material, the elution of the elements constituting the structural material including the iron, the chromium and the like can be suppressed and the exfoliation of the above described oxide film which has been deposited on the surface of the structural material can be prevented.

Furthermore, similarly to the second embodiment to be conducted in the secondary system 12 of the pressurized-water-type nuclear power plant, it becomes possible to suppress the elution of the element constituting the structural material, by injecting hydrogen into the feed water from the corrosion suppression substance introduction line 52, in addition to depositing the corrosion suppression substance such as titanium oxide injected from the corrosion suppression substance introduction line 52 on the surface of the structural material.

Moreover, similarly to the third embodiment to be conducted in the secondary system 12 of the pressurized-water type nuclear power plant, it is possible to reduce the amount of a used oxidant and reduce the operation cost, by injecting the oxidant into the feed water from the oxidant injection line 51 to form an oxide film on the surface of the structural material to come in contact with the feed water, and controlling the amount of an oxidant to be injected by using a corrosion potentiometer 53 which measures the change of the corrosion potential of the surface of the feed water pipe 46, in addition to depositing the corrosion suppression substance such as titanium oxide injected from the corrosion suppression substance introduction line 52 on the surface of the feed water pipe.

The invention claimed is:

1. An operation method of a plant including a secondary system of a pressurized-water-type nuclear power plant, which has a low-pressure feed water heater, a deaerator and a high-pressure feed water heater sequentially arranged in a feed water pipe reaching a steam generator from a condenser, and leads high-temperature feed water to a steam or a feed water system of a thermal power plant which has a low-pressure feed water heater, a deaerator and a high-pressure feed water heater sequentially arranged in a feed water pipe reaching a boiler from a condenser, and leads high-temperature feed water to a pressure reaction vessel, the operation method of the plant comprising:

forming an oxide film for suppressing an elution of an element constituting a structural material of at least one of the feed water pipe, the low-pressure feed water heater, the deaerator and the high-pressure feed water heater which come in contact with the high-temperature feed water, on a surface of the structural material by injecting an oxidant into the high-temperature feed water of which pH is adjusted to 9 to 10 during generation of power; and depositing a corrosion suppression substance on the oxide film formed on the surface of the structural material in a region in which the corrosion accelerated by a flow of a feed water occurs, by introducing the corrosion suppression substance into the feed water, the corrosion suppression substance being oxide or hydroxide containing one or more elements selected from Ti, Zr, Ce, Nb, La, Nd and Y.

2. The plant operation method according to claim 1, wherein the oxide film is formed by injecting at least one oxidant selected from a group of oxygen, hydrogen peroxide and ozone into the high-temperature feed water.

3. The plant operation method according to claim 2, wherein the oxidant is injected in a downstream side of the condenser and in an upstream side of the low-pressure feed water heater in the feed water pipe.

4. The plant operation method according to claim 2, wherein the oxidant to be injected into the feed water for forming the film is injected so as to make a dissolved oxygen concentration in the feed water 5 ppb or more.

5. The plant operation method according to claim 2, wherein an injection amount of the oxidant to be injected into the feed water is controlled by monitoring a corrosion potential of the feed water.

6. The plant operation method according to claim 1, wherein the corrosion suppression substance is titanium oxide and 5 μg/cm$^2$ or more of the titanium oxide is deposited on the surface of the structural material.

7. The plant operation method according to claim 1, wherein the corrosion suppression substance is in a state of colloid or slurry having a fine particle diameter and is deposited on the surface of the structural material by spraying, thermal spraying or injection into the feed water.

8. The plant operation method according to claim 1, wherein the corrosion suppression substance is introduced in a downstream side of the condenser and in an upstream side of the high-pressure feed water heater in the feed water pipe.

9. The plant operation method according to claim 1, wherein the feed water flowing in an inside of the structural material of the feed water pipe has a temperature of 15° C. or higher and 350° C. or lower.

10. The plant operation method according to claim 1, wherein a flow of the feed water, which accelerates corrosion, has a flow velocity of 1 msec or more and 20 msec or less.

11. The plant operation method according to claim 1, wherein hydrogen is injected in the feed water flowing in an inside of the structural material of the feed water pipe.

12. The plant operation method according to claim 11, wherein the hydrogen is injected so as to make a dissolved hydrogen concentration in the feed water 1 ppb or more.

13. An operation system of a secondary system of a pressurized-water-type nuclear power plant which has a low-pressure feed water heater, a deaerator and a high-pressure feed water heater sequentially arranged in a feed water pipe reaching a steam generator from a condenser, and leads high-temperature feed water of which pH is adjusted to 9 to 10 to the steam generator, the plant operation system comprising:

an oxidant injection unit which is provided in a downstream side of the condenser and in an upstream side of the low-pressure feed water heater in the feed water pipe, and during generation of power injects an oxidant for forming an oxide film into the high-temperature feed water, the oxide film suppressing an elution of an element constituting a structural material of at least one of the feed water pipe, the low-pressure feed water heater, the deaerator and the high-pressure feed water heater, which come in contact with the high-temperature feed water, onto a surface of the structural material; and a corrosion suppression substance introduction unit which is provided in a downstream side of the deaerator and in an upstream side of the high-pressure feed water heater in the feed water pipe, and introduces a corrosion suppression substance so as to deposit the corrosion suppression substance on the oxide film formed on the surface of the structural material in a region in which corrosion accelerated by a flow of the feed water occurs.

14. An operation system of a thermal power plant which has a low-pressure feed water heater and a high-pressure feed water heater sequentially arranged in a feed water pipe reaching a boiler from a condenser, and leads high-temperature feed water of which pH is adjusted to 9 to 10 to the boiler, the plant operation system including an injection unit which is provided in a downstream side of the condenser and in an upstream side of the low-pressure feed water heater in the feed water pipe, and during generation of power injects an oxidant for forming an oxide film into the high-temperature feed water, the oxide film suppressing an elution of an element constituting a structural material of at least one of the feed water pipe, the low-pressure feed water heater and the high-pressure feed water heater, which come in contact with high-temperature feed water, onto a surface of the structural material, and a corrosion suppression substance for depositing the corrosion suppression substance into a feed water, the corrosion suppression substance being oxide or hydroxide containing one or more elements selected from Ti, Zr, Ce, Nb, La, Nd and Y, onto the oxide film formed on the surface of the structural material in a region in which corrosion accelerated by a flow of the feed water occurs.

* * * * *